Jan. 12, 1971   K. H. BRECH   3,554,015
ULTRASONIC PULSE-ECHO APPARATUS
Filed March 22, 1968
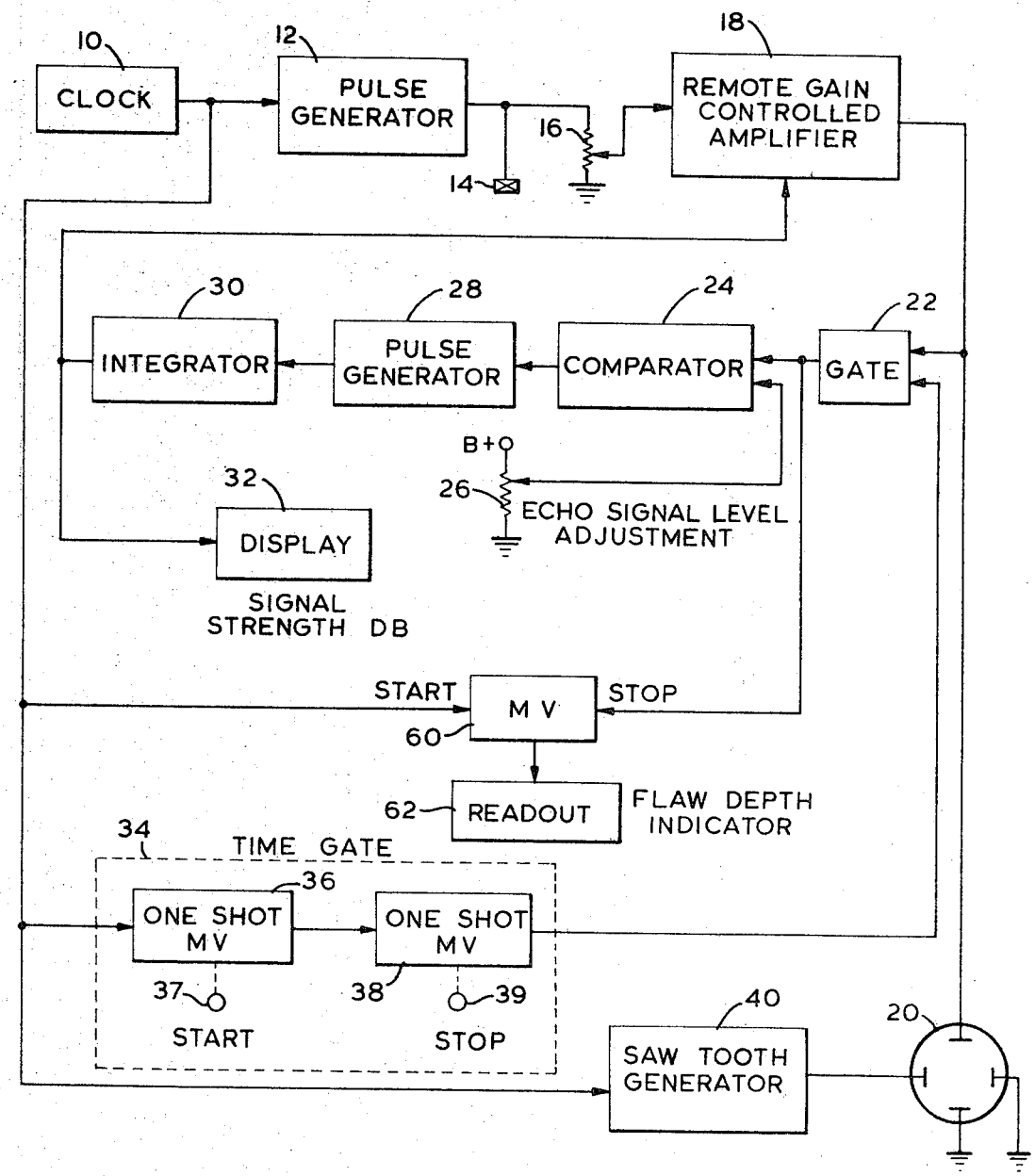
FIG. 1
FIG. 2
Kilian H. Brech
INVENTOR.
BY:
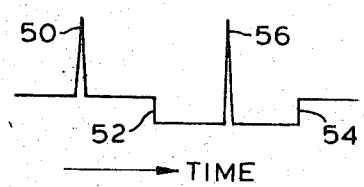

United States Patent Office 3,554,015
Patented Jan. 12, 1971

3,554,015
ULTRASONIC PULSE-ECHO APPARATUS
Kilian H. Brech, Norwalk, Conn., assignor to Branson Instruments, Incorporated, Stamford, Conn., a corporation of Delaware
Filed Mar. 22, 1968, Ser. No. 715,276
Int. Cl. G01n 29/04
U.S. Cl. 73—67.9                                11 Claims

ABSTRACT OF THE DISCLOSURE

An ultrasonic pulse-echo test apparatus includes a feedback circuit coupled to a remote gain controlled video amplifier for maintaining the amplitude of the echo signal displayed on a cathode ray tube substantially constant. The amplitude of the feedback signal required to maintain constant echo amplitude is displayed on a meter, indicating the size of a flaw in relation to a calibration setting. Conventional switching of attenuators in and out of the circuit to determine flaw size is eliminated.

---

This invention refers to an ultrasonic pulse-echo apparatus for nondestructively testing materials, particularly for investigating the presence of defects, flaws, occlusions, etc. in materials. More specifically, this invention refers to an improved pulse-echo ultrasonic flaw detection apparatus wherein the echo signal arising in response to an acoustic discontinuity, such as a flaw, is maintained constant and its relative size with respect to a standard is indicated on a display means, such as a meter.

Ultrasonic pulse-echo apparatus for investigating the soundness of a workpiece such as metal, metal laminates and the like, is well established. The basic circuit for a pulse-echo apparatus is described in U.S. Pat. No. 2,280,226 issued to F. A. Firestone, dated Apr. 21, 1942 entitled "Flaw Detecting Device and Measuring Instrument." Further descriptions of the basic principle will be found also in various textbooks, such as "Ultrasonic Engineering" by Julian R. Frederick, John Wiley & Sons, Inc., New York, N.Y., 1965, specifically chapter 7, page 244, entitled "Flaw Detection," and "Sonics" by T. F. Hueter and R. H. Bolt, John Wiley & Sons, Inc., New York, N.Y., 1955, pages 385–386.

The basic technique for pulse-echo testing comprises the use of an instrument having a pulse generating circuit, a video amplifier, an ultrasonic transducer, and a cathode ray tube with deflection circuitry. When suitably interconnected, the pulse generating circuit supplies periodically an ultrasonic pulse to the transducer which is placed in contact with one side of the workpiece to be tested. The transducer converts the electrical signal applied thereto to an acoustic signal which is sent into the workpiece to be tested and propagated therein. Responsive to an acoustic discontinuity, a reflection or echo signal is produced which is sensed by the transducer, converted into an electrical signal, amplified by the video amplifier and displayed on the cathode ray tube along a time base axis. The displacement of the echo signal with respect to the initiation of the signal pulse as seen on the cathode ray tube provides a measure of the location of the flaw relative to the entrant surface of the workpiece, and the amplitude of the echo signal is indicative of the size or configuration of the flaw. This echo presentation is known as the conventional A-scan.

In the normal flaw detection test procedure, the operator by means of gain controls provided adjusts the pulse-echo apparatus to produce a certain amplitude of the echo signal presented when the transducer is applied to a gauge block which is equipped with a selected reference flow. When the desired amplitude indication is achieved, for instance a one-inch deflection, the operator increases the gain of the apparatus by removing attenuators normally provided in the echo receiving circuit portion of the apparatus. Typically, several attenuators, calibrated in units of decibels (db), can be inserted or removed from the circuit by switches and typically, the operator may remove from the receiving circuit the attenuator calibrated 14 db. When this attenuator is removed and assuming that no further adjustments have been made, the pulse-echo apparatus now provides an echo signal amplitude indication which is 14 db larger for the same flaw to which the instrument was adjusted originally. This means that the apparatus is sufficiently sensitive to detect defects which are significantly smaller than the flaw to which the instrument was calibrated, and in this manner it can reasonably be assured that smaller defects are not passed over when an actual workpiece is tested.

When the operator discovers a flaw in the workpiece under test, he decreases the gain by 14 db by inserting the db attenuator formerly removed from the circuit, and then compares the amplitude of the unknown flaw with the amplitude against which the equipment was originally calibrated. In order to accomplish this comparison test, the operator must stop the procedure of exploring the workpiece as soon as he discovers a flaw, reinsert into the circuit the proper attenuator and then perform the actual flaw comparison check. While performing this operation, the operator is not sure whether the transducer has inadvertently been moved and it may be necessary for him to repeat the procedure a second time and possibly go back to one or more gauge blocks having a calibrated flaw in order to assess the size of the defect. It will be apparent that the above procedure is rather cumbersome and tedious.

The apparatus described hereinafter overcomes the above stated problem by using a feedback circuit to provide a substantially constant echo signal amplitude and indicating on a display device the amplitude of the feedback signal which, in turn, is indicative of the relative size of the flaw or defect. This indication is provided on a continuing basis, thereby eliminating the heretofore required attenuator switching operation. It will be apparent that such an arrangement greatly simplifies the test operation and reduces significantly the possibility of misjudgment of flaw size. In addition, the novel circuit arrangement greatly increases the dynamic range of the apparatus, thus permitting the testing for flaws of widely different size without the necessity for resetting amplifier gain controls.

One of the principal objects of this invention is, therefore, the provision of a new and improved ultrasonic pulse-echo apparatus, eliminating one or more of the disadvantages and shortcomings of the prior art devices.

Another important object of this invention is the provision of a pulse-echo flaw detecting apparatus which provides simplified operation.

Still another important object of this invention is the provision of an ultrasonic pulse-echo flaw detection apparatus which can be operated on a continuing basis without frequent reference to a calibrated defect.

A further and other object of this invention is the provision of a pulse-echo flaw detection apparatus which provides a substantially constant echo amplitude and indicates the deviation of a particular flaw from a reference adjustment made previously.

A still further object of this invention is the provision of a pulse-echo ultrasonic test apparatus having a greatly extended dynamic test range.

Still other and further objects of this invention will be more readily apparent by reference to the following description when taken in conjunction with the accompanying drawings in which:

FIG. 1 is a schematic circuit diagram of the improved apparatus of the invention, and FIG. 2 is a schematic illustration of the flaw indication obtained on a cathode ray tube.

Referring now to the figures, numeral 10 identifies a clock or synchronizer which is coupled to a pulse generator 12, causing the pulse generator to periodically generate a train of pulses in the ultrasonic frequency range. The train of pulses is applied to a piezoelectric transducer 14 which is coupled to the surface of a workpiece which is to be explored by ultrasonic energy. As the ultrasonic energy is propagated in the workpiece, the presence of an acoustic discontinuity causes a reflection or an echo signal which is sensed by the transducer 14 and is converted by the transducer to an electrical signal. The echo responsive electrical signal then is passed via an adjustable signal attenuating means 16, such as a potentiometer, to a remote gain controlled video amplifier 18. The amplifier amplifies the echo responsive signal and applies the signal to the vertical deflection plates of a cathode ray tube 20 where the echo responsive signal is displayed as a vertical spike, such as is indicated by the numeral 56 in FIG. 2.

As has been stated hereinabove, the circuit of the present ultrasonic apparatus is arranged to maintain the amplitude of the displayed echo signal 56 substantially constant. In order to accomplish this, the output signal from the amplifier 18 is fed as one of the input signals to a gate circuit 22 which receives as its other input signal a time gate signal developed in the time gate circuit 34. The circuit 34 comprises essentially two one-shot multivibrator circuits 36 and 38, each having an adjusting means 37 and 39 for respectively starting and stopping the time gate, thereby creating a "window" for passing echo signals which occur during an adjusted time interval, while rejecting all other signals. In this way, as is well understood by those skilled in the art, the zone under test within the workpiece is selected. The gate 22 permits an output signal to occur only when the echo signal 56, FIG. 2, falls within the adjusted open condition of the timing gate, the start 52 of the time gate being controlled by the adjustment 37 of the multivibrator 36 and the termination 54 of the time gate being controlled by the adjustment 39 of the multivibrator 38.

The output from the gate 22 is coupled to a comparator circuit 24 which is connected also to receive a reference signal from a source 26 for adjusting the echo signal level, that is, providing a means for passing only echo signals which exceed a desired level. If the amplitude of the signal from the amplifier 18 exceeds the amplitude of the reference signal, the comparator 24 provides an output pulse which is transmitted to a pulse generator 28, causing this pulse generator to provide an output signal which is applied to an integrating means 30, typically a low-pass filter circuit having a time constant which is much greater than the pulse repetition rate provided by the clock 10. The output from the filter circuit is used as a feedback signal to the amplifier 18 for controlling the gain of the amplifier. This feedback loop across the amplifier 18 serves to maintain the amplitude of the displayed echo signal substantially constant. A display device, such as a meter 32, is connected to the integrating means 30 for displaying the amplitude of the feedback signal. Most suitably the meter can be calibrated in units of db, thus providing an indication of the size of the defect causing the echo signal. A sawtooth generator 40 coupled to the clock 10 is coupled to the horizontal deflection plates of the cathode ray tube 20 to provide the conventional time base axis. Numeral 50 in FIG. 2 indicates the initial signal pulse and the distance between the spike 50 and the echo signal 56 is a measure of the location of the defect with reference to the surface of the workpiece at which the transducer 14 is applied.

The operation of the circuit may be explained as follows: It is assumed that the clock has a pulse repetition rate of about 2 kHz. and the integrating means in the form a low-pass filter has a time constant of one second and no flaw responsive echo signal 56 is present. Then, as long as no flaw responsive signal occurs during the generation of the time gate 52, 54, the voltage from the intergrating means 30 drops to a minimum, or substantially to zero, and simultaneously the gain of the amplifier 18 increases to a maximum.

If subsequently a flaw responsive echo signal appears and remains of constant amplitude and such flaw responsive signal is of larger amplitude than the voltage provided by the potentiometer 26, the comparator 24 is actuated during the instant the echo signal 56 appears and this occurrence causes the pulse generator 28 to generate a pulse which, in turn, produces a voltage signal at the output side of the integrating means 30, the amplitude of this voltage signal being proportional to the area under the pulses generated by the generator 28. This voltage signal causes a decrease in the gain applied to the amplifier 18. Because of the long time constant of the integrating means, the reduced gain prevails with little change for one clock cycle. If during the next ensuing clock cycle the amplitude of the echo 56 is still larger than the voltage from the potentiometer 26, another pulse signal is generated by the pulse generator 28, this pulse signal when passing through the integrating means 30 causes the negative feedback signal applied to the amplifier to increase in an amount proportional to the area under the pulse generated by the pulse generator 28. This causes a further decrease in the gain effective upon the amplifier 18.

This cycle of operation continues until the amplitude of the echo signal 56 is less than the voltage provided by the potentiometer 26 and stability is reached. After a short lapse of time, the voltage across the output of the low-pass filter decays to a value where another pulse is generated by the pulse generator 28 to restore the stability value.

If the flaw responsive echo 56 provided by the amplifier 18 and gate 22 is of a lower signal level than the voltage from potential divider 26, the output signal from the integrating means decays and the gain signal applied to amplifier 18 decreases, causing the amplifier output signal to increase until the signal provided by amplifier 18 and gate 22 exceeds the voltage on potentiometer 26, at which time a pulse is generated again by comparator 24.

If the flaw responsive echo signal disappears, the amplifier 18 returns to maximum gain condition.

In the preferred method of operation, the transducer 14 is set upon a standard test block having one or more defects of known dimension. The instrument 32 is a meter with center marked zero and calibrated in plus and minus db units relative to the zero marking. Using the known defect the desired echo signal sensitivity setting is made by means of the control forming a part of the reference source 26. The attenuator 16 is adjusted to cause the pointer of the meter 32 to be in its center position. When testing a workpiece and discovering flaws, the meter 32 then will read either in units of plus db or minus db, thus indicating the relative size and deviation of the discontinuity from the calibration setting. Some defects smaller than a given size are excluded from the measurement due to the signal level provided by the source 26.

It will be apparent that no further adjustments need to be made and that the readings on the instrument 32 occur on a continuing basis while an echo indication 56 is present on the cathode ray tube. Since the amplitude of the echo signal 56 remains substantially constant, there is little chance for an operator to miss a defect, causing the reliability of the test procedure to be greatly enhanced. By virtue of the absence of the attenuator controls which needed to be operated during the actual testing in the heretofore known procedure, a great simplification and attendant ease of operation is obtained.

The above described feedback arrangement extends significantly the dynamic range of measurement. In the prior art circuits, the full dynamic range is limited essentially by the saturation condition of the amplifier 18, and normally the average measuring range extends over approximately 35 db. The improved arrangement disclosed heretofore enables the measuring range to be extended to 80–100 db.

A still further feature of this invention comprises the provision of a meter read-out circuit for indicating the depth of the defect or flaw from the workpiece surface. To this end, a bistable multivibrator 60 is connected to the output from the clock 10 and to the output from the gate circuit 22 thereby receiving respectively a START and a STOP signal. The multivibrator 60, therefore, is in the actuated condition for a period of time which equals the interval from the initiation of the signal pulse to the receipt of the echo responsive output signal from the amplifier 18. The read-out circuit 62 converts this time interval to a meter indication. Typically, the read-out circuit comprises a capacitor charging circuit, a peak detector circuit, and a peak reading meter for indicating the electrical charge of the capacitor. The meter read-out provision constitutes an added convenience for the operator since the time lapse between the signals 50 and 56 appearing on the cathode ray tube is directly readable as a numerical value.

While there has been described and illustrated a certain preferred embodiment of the invention, it will be apparent to those skilled in the art that various changes and modifications may be made therein without deviating from the broad principle and intent of this invention.

What is claimed is:

1. In an ultrasonic pulse-echo apparatus which includes an electrical pulse generating circuit and an electro-acoustic transducer, said generating circuit coupled for periodically applying an ultrasonic pulse signal to said electro-acoustic transducer which is adapted to transmit an ultrasonic search signal into an object and receive subsequently a flaw responsive echo signal therefrom, such echo signal arising from an acoustic discontinuity being intercepted by said signal within the object; a gain controlled pulse amplifier coupled for receiving such flaw responsive echo signal and adapted to provide an output signal in response to the receipt of such an echo signal; a display circuit coupled to said amplifier for receiving and displaying said output signal; and time gate means coupled to said amplifier for receiving a signal corresponding to said output signal, said gate means being controlled to be operative for providing a further output signal responsive to the receipt of said output signal from said pulse amplifier only during the time interval in which said flaw responsive echo output signal is expected to occur, the improvement comprising:

circuit means, which include a signal comparison means and a reference signal means providing a reference signal to said comparison means, coupled between said amplifier and said gate means for receiving said further output signal from said gate means and for providing a feedback signal to said amplifier, said feedback signal controlling the gain of said amplifier in a direction to maintain the amplitude of the echo responsive output signal provided by said amplifier substantially constant, and display means coupled for indicating a value commensurate with the amplitude of said feedback signal.

2. In an ultrasonic pulse-echo apparatus as set forth in claim 1, said display means being a meter.

3. In an ultrasonic pulse-echo apparatus as set forth in claim 2, said meter indicating units of decibels.

4. In an ultrasonic pulse-echo apparatus as set forth in claim 1, said circuit means including a further pulse generating means coupled to said comparison means for providing an output signal when said echo responsive output signal from said amplifier exceeds the level of said reference signal, and a low-pass filter circuit having a substantially long time constant relative to the pulse repetition rate of said periodically applied ultrasonic pulse signal coupled for receiving said signal from said further pulse generating means and providing as output said feedback signal to said amplifier for controlling the gain thereof.

5. In an ultrasonic pulse-echo apparatus as set forth in claim 4, said reference signal being adjustable.

6. In an ultrasonic pulse-echo circuit as set forth in claim 1 and means for adjusting said time gate means with respect to the time the ultrasonic pulse signal is applied to said transducer.

7. In an ultrasonic pulse-echo circuit as set forth in claim 3 said meter having markings indicating plus and minus decibel units relative to a zero scale marking.

8. In an ultrasonic pulse-echo circuit as set forth in claim 1, and means coupled for adjusting the level of the echo responsive signal received by said gain controlled amplifier from said transducer.

9. In a pulse-echo apparatus comprising:

a pulse generating circuit for periodically applying an ultrasonic pulse signal to an electro-acoustic transduced adapted to transmit an ultrasonic search signal into an object and adapted to subsequently receive a flaw responsive echo signal therefrom, such echo signal arising by the search pulse intercepting an accoustic discontinuity within the object;

a gain controlled pulse amplifier coupled for receiving said echo signal and providing an output signal corresponding to the echo signal;

a display circuit coupled for displaying the amplitude of said output signal provided by said pulse amplifier;

a time gate means coupled to said pulse generating circuit and said amplifier for receiving a time gated control signal responsive to the operation of said pulse generating circuit and a signal responsive to the output signal from said amplifier, and said gate means responsive to said control signal providing an output signal only if said echo responsive output signal from said amplifier occurs during the time interval a flaw responsive echo signal is expected to occur;

a comparator circuit coupled for receiving said output signal from said time gate means and also an adjustable reference signal, and providing an output signal responsive to the condition when the amplitude of said output signal from said time gate means exceeds the amplitude of said reference signal;

a pulse generator coupled for receiving said output signal from said comparator circuit and providing in response to the receipt of said output signal a further pulse signal;

a low-pass filter, having a substantially long time constant in relation to the repetition rate of the periodically applied ultrasonic pulse signal, coupled for receiving said further pulse signal from said pulse generator and providing an output signal whose amplitude is proportional to the area under said further pulse signal;

means for coupling said output signal from said filter as a feedback signal to said gain controlled amplifier for maintaining the amplitude of said echo responsive output signal provided by said amplifier to said display circuit substantially constant; and means coupled to said feedback signal for displaying a value commensurate with the amplitude of said feedback signal.

10. In a pulse-echo apparatus as set forth in claim 9 and including a signal attenuating means coupled for adjusting the amplitude of the echo responsive signal transmitted by said transducer to said gain controlled amplifier.

11. In a pulse-echo apparatus as set forth in claim 9 and including a meter readout circuit coupled to receive a first signal when said transducer is caused to transmit an ultrasonic search signal into the object and a second signal responsive to the output signal from said time gate means, said meter circuit being adapted to display on a meter a value commensurate with the time interval between said first and said second signal.

References Cited

UNITED STATES PATENTS

| 3,041,872 | 7/1962 | Brown et al. | 73—67.9 |
| 3,048,031 | 8/1962 | Beaujard et al. | 73—67.8 |
| 3,427,866 | 2/1969 | Weighart | 73—67.7 |

RICHARD C. QUEISSER, Primary Examiner

J. P. BEAUCHAMP, Assistant Examiner